United States Patent
Gunning et al.

(10) Patent No.: US 9,762,567 B2
(45) Date of Patent: Sep. 12, 2017

(54) WIRELESS COMMUNICATION OF A USER IDENTIFIER AND ENCRYPTED TIME-SENSITIVE DATA

(71) Applicant: HEWLETT-PACKARD DEVELOPMENT COMPANY, L.P., Houston, TX (US)

(72) Inventors: Chris R. Gunning, Boise, ID (US); Thomas S Gale, Boise, ID (US); Shivaun Albright, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 14/770,252

(22) PCT Filed: Mar. 14, 2013

(86) PCT No.: PCT/US2013/031141
§ 371 (c)(1),
(2) Date: Aug. 25, 2015

(87) PCT Pub. No.: WO2014/142857
PCT Pub. Date: Sep. 18, 2014

(65) Prior Publication Data
US 2016/0014112 A1    Jan. 14, 2016

(51) Int. Cl.
*H04L 29/06* (2006.01)
*H04W 12/06* (2009.01)
*H04W 4/00* (2009.01)

(52) U.S. Cl.
CPC ...... *H04L 63/0807* (2013.01); *H04L 63/0492* (2013.01); *H04L 63/062* (2013.01);
(Continued)

(58) Field of Classification Search
USPC .......................... 713/159, 175; 726/3, 9, 28
See application file for complete search history.

(56) References Cited

U.S. PATENT DOCUMENTS

| | | | |
|---|---|---|---|
| 6,694,115 B2 | 2/2004 | Weaver | |
| 6,751,732 B2 | 6/2004 | Strobel et al. | |

(Continued)

FOREIGN PATENT DOCUMENTS

| | | |
|---|---|---|
| EP | 1259872 | 10/2008 |
| WO | WO-2013033388 A1 | 3/2013 |
| WO | WO-2013184128 | 12/2013 |

OTHER PUBLICATIONS

Cypherpunks, "Smart Cards and Crypto Devices," Jan. 8, 2006, retrieved from: <http://www.cypherpunks.to/~peter/T7_Smart_Cards.pdf>.

(Continued)

*Primary Examiner* — Jason Lee
(74) *Attorney, Agent, or Firm* — HP Inc. Patent Department (57) ABSTRACT

Examples disclosed herein relate to wireless communication of a user identifier and encrypted time-sensitive data. Examples further include wireless communication of an authentication token including a user identifier and encrypted time-sensitive data. Examples further include interaction with a remote authentication service. Examples further include utilization of near field communication (NFC).

15 Claims, 3 Drawing Sheets

(52) U.S. Cl.
CPC ........ *H04L 63/083* (2013.01); *H04L 63/0853* (2013.01); *H04W 4/008* (2013.01); *H04W 12/06* (2013.01)

(56) References Cited

U.S. PATENT DOCUMENTS

| | | | |
|---|---|---|---|
| 8,175,643 B1 | 5/2012 | Hawkins | |
| 8,189,225 B1 | 5/2012 | Lo et al. | |
| 8,321,922 B1 | 11/2012 | Lo et al. | |
| 8,750,514 B2* | 6/2014 | Gallo | G06Q 10/10 380/270 |
| 8,966,588 B1 | 2/2015 | Pizot et al. | |
| 9,052,861 B1 | 6/2015 | Pizot et al. | |
| 2003/0204453 A1* | 10/2003 | Kawamata | G06Q 30/06 705/28 |
| 2005/0015594 A1 | 1/2005 | Ashley et al. | |
| 2005/0240558 A1* | 10/2005 | Gil | G06F 17/30893 |
| 2009/0106042 A1 | 4/2009 | Maytal et al. | |
| 2010/0069008 A1 | 3/2010 | Oshima et al. | |
| 2011/0161674 A1 | 6/2011 | Ming | |
| 2011/0286028 A1 | 11/2011 | Kinouchi et al. | |
| 2012/0159584 A1 | 6/2012 | Pizot et al. | |
| 2013/0145420 A1 | 6/2013 | Ting et al. | |
| 2014/0282994 A1* | 9/2014 | Dietrich | G06F 21/34 726/9 |

OTHER PUBLICATIONS

Edith C. H. Ngai et al., "Quality of Information Aware Data Collection for Mobile Sensor Networks," 2012, IEEE, See abstract: p. 42, left col. line 12, right col. line 4.

GSM Association, "NFC UICC Requirement Specification," Ver. 2.0, Nov. 2011, retrieved from: <http://www.gsma.com/mobilenfc/wp-content/uploads/2012/03/gsmanfcuiccrequirementsspecification20.pdf>.

International Searching Authority International Search Report and Written Opinion, Nov. 1, 2013: 9 pages.

Laurent Pizot et al. (inventors), "Establishing a Secure Connection Between a Print Generation Service and a Base Station Printer," U.S Appl. No. 13/072,720, filed Mar. 27, 2011, 18 pages.

M'raihi et al., "HOTP: An HMAC-Based One-Time Password Algorithm," Network Working Group, RFC 4226, Dec. 2005, retrieved from: <http://tools.ietf.org/pdf/rfc4226.pdf>.

M'Raihi et al., "TOTP; Time-Based One-Time Password Algorithm," Network Working Group, RFC 6238, May 2011, retrieved from: <http://tools.ietf.org/pdf/rfc6238.pdf>.

Mandel et al., "MIT Proximity Card Vulnerabilities," retrieved Feb. 9, 2013 from: <http://www.josephhall.org/tmp/mit_prox_vulns.pdf>.

PrinterOn Corporation, "PrinterOn(R) Enterprise", Jun. 2012.

Sasch, "Personal Printing Essentials 2.0 now with touch-free Near Field Communication (NFC) support for Android and BlackBerry," Oct. 11, 2011, Cortado AG, <http://www.thinprint.com/News/News/ArticleDetails/tabid/392/articleType/ArticleView/articleId/144/Default.aspx.

Smart Card Alliance. "Smart Card Primer," Dec. 5, 2006, retrieved from: <http://web.archive.org/web/20061205220114/http://www.smartcardalliance.org/pages/smart-cards-intro-primer>.

Wikipedia, "Challenge-response authentication," Oct. 31, 2012, retrieved from: <http://en.wikipedia.org/wiki/Challenge_response>.

Wikipedia, "Contactless smart card," Feb. 7, 2013, retrieved from: http://en.wikipedia.org/wiki/Contactles_smadcard.

Wikipedia, "Proximity card," Feb. 7, 2013, retrieved from: <http://en.wikipedia.org/wiki/Proximity_card>.

Wikipedia, "Security token," Feb. 7, 2013, retrieved from: <http://en.wikipedia.org/wiki/Security_token>.

Wikipedia, "Smart card," Feb. 2, 2013, retrieved from: <http://en.wikipedia.org/wiki/Smart_card>.

Wikipedia, "UICC," Jan. 5, 2013, retrieved from: <http://en.wikipedia.org/wiki/UICC>.

Cortada AG, "Get Started Now—Personal Printing in Use," available Feb. 9, 2013, <www.thinprint.com/Products/Overview/PersonalPrinting/Getstarted.aspx>.

Cortado AG, "Cortado's Personal Printing Essentials Delivers Touch-Free Mobile Phone Authentication," Oct. 11, 2011, Press Releases, <http://www.theprint.com/Portals/deutsch/Documentation/Press/Pressreleases.Press-Release_Personal-Printing-2-0_EUR.pdf>.

Cortado AG, "Personal Printing Essentials: Secure printing (version 2.0)," Mar. 8, 2013, <http://www.thinprint.com/Portals/deutsch/Documentation/Manuals/personal_printing_essentials_en.pdf>.

* cited by examiner

WIRELESS COMMUNICATION OF A USER IDENTIFIER AND ENCRYPTED TIME-SENSITIVE DATA

BACKGROUND

Due to various security concerns, utilization of a computing device may be restricted to a specific user, or a specified group of users. To prevent unauthorized use of the computing device, the computing device may prevent a user from accessing most functionalities of the computing device prior to the user being successfully authenticated. For example, a user may be prevented from utilizing a computing device until a correct username and password are submitted to the computing device.

BRIEF DESCRIPTION OF THE DRAWINGS

The following detailed description references the drawings, wherein.

DETAILED DESCRIPTION

As noted above, to prevent unauthorized use of a computing device, the computing device may prevent a user from accessing most functionalities of the computing device prior to the user being successfully authenticated. For example, a computing device such as a printing device (e.g., a printer, a multifunction printer (MFP), etc.), may prevent a user from utilizing functionalities of the printing device until the user has been authenticated to the printing device.

A user may be authenticated in any of several different ways. However, many authentication techniques are insecure, complex, time-consuming, error-prone, or a combination thereof. For example, authentication techniques in which a user enters authentication information manually may be both time-consuming and error-prone. As another example, a device may perform an automated process to provide fixed authentication information (e.g., a fixed user identifier) to a computing device for authentication of the user. However, because the authentication information is fixed, this technique may be vulnerable to a replay attack, in which an unauthorized party obtains the fixed authentication information from the user (e.g., via eavesdropping on a transaction) and then uses it to gain access to the computing device. In other examples, a device may authenticate a user to a system by participating in a challenge-response handshake with the system, a third party, or a combination thereof. However, such techniques are complicated and may involve multiple communications between the device and the system, third party, etc.

To address these issues, examples described herein may provide a mobile device to register a user identifier with a remote authentication service used by a computing device for user authentication and, in response to a determination that the mobile device is within near field communication (NFC) proximity of a computing device, acquire current time-sensitive data from a periodically different time-sensitive data source of the mobile device. In some examples, the mobile device may further encrypt the current time-sensitive data such that it is decryptable using decryption information that the remote authentication service has associated with the registered user identifier, and wirelessly provide to the computing device an authentication token including the user identifier and the encrypted time-sensitive data. In such examples, the computing device (e.g., a printer, an MFP, etc.), may provide the authentication token to the remote authentication service for authentication, and receive in response an indication of whether the user has been authenticated by the remote authentication service.

In this manner, examples described herein may provide a less vulnerable and simpler technique for authenticating a user to a computing device, such as a printing device. For example, the remote authentication service may authenticate the user associated with the user identifier if, after decrypting the time-sensitive data with decryption information associated with the user identifier, the time-sensitive data is within a predefined threshold of corresponding time-sensitive data generated by the remote authentication service. In this manner, examples described herein may guard against replay attacks by including time-sensitive data in the authentication token, and may guard against spoofing by encrypting the time-sensitive data.

In examples in which the remote authentication service authenticates the user based on the user identifier and encrypted time-sensitive data, as described above, the remote authentication service may inform the computing device that the user has been authenticated. In such examples, the user may be authenticated to the computing device based on a one-way provision of the authentication token from the mobile device to the computing device. In this manner, examples described herein may provide an authentication technique that is both secure and simple. Additionally, in some examples, the authentication token may be provided wirelessly from the mobile device to the computing device in response to the mobile device being in NFC proximity to the computing device. In this manner, examples described herein may provide an easy-to-use authentication technique in which the user may provide sufficient authentication information for the user to be authenticated to the computing device by bringing the mobile device within NFC proximity of the computing device (e.g., by tapping the mobile device to the computing device). Additionally, by authenticating the user at a remote authentication service, examples described herein may be more scalable than systems in which user authentication information is stored at individual computing devices (e.g., printers, etc.). Examples described herein may also be simpler, as user authentication information may be updated at one central system (i.e., the remote authentication service) rather than at each computing device to which the user may wish to authenticate (e.g., by pushing updated information to the various computing devices).

Figure 1:
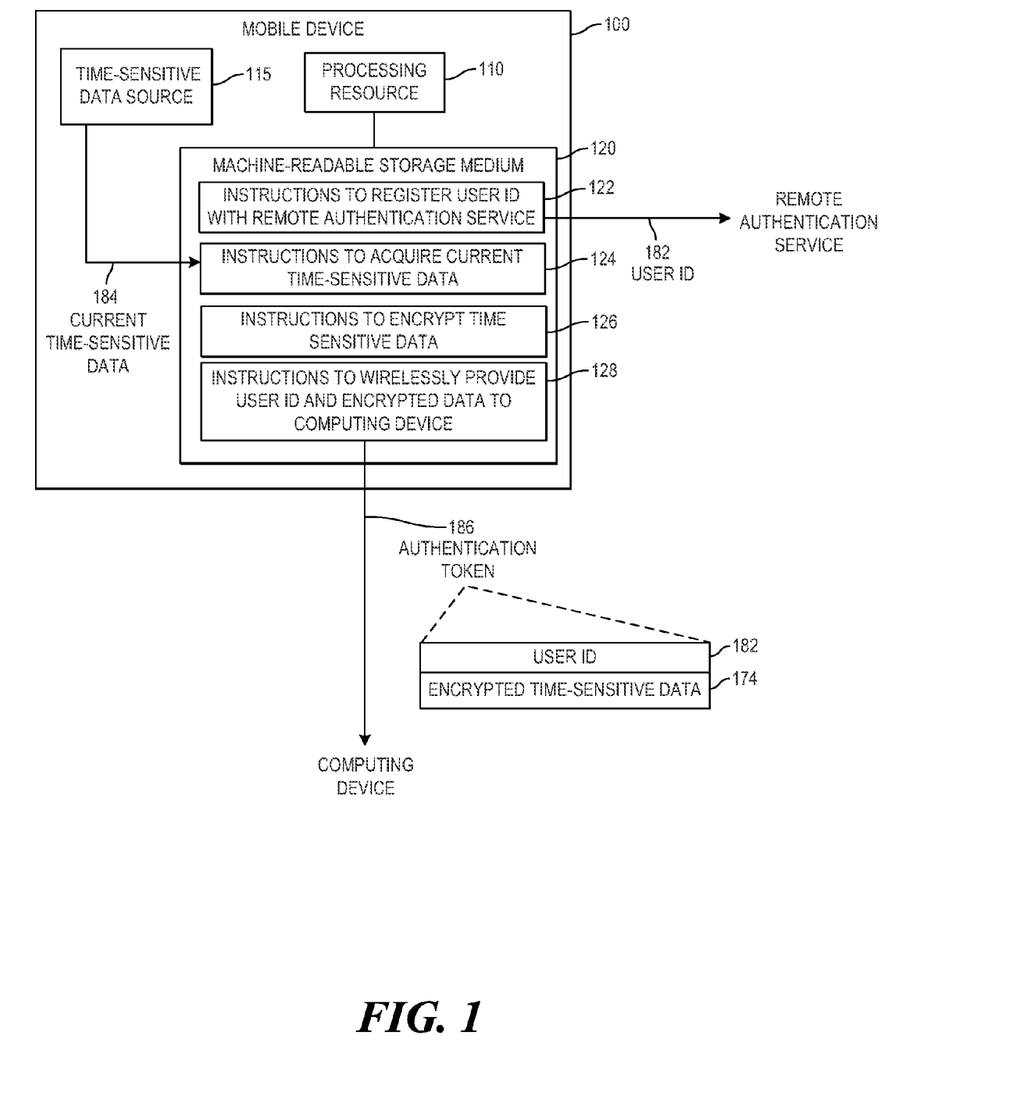
FIG. 1 is a block diagram of an example mobile device to wirelessly provide an authentication token including encrypted time-sensitive data to a computing device.

Referring now to the drawings, FIG. 1 is a block diagram of an example mobile device 100 to wirelessly provide an authentication token including encrypted time-sensitive data to a computing device. As used herein, a "computing device" may be a desktop computer, notebook computer, workstation, tablet computer, mobile phone, smart device, server, printing device, or any other processing device or equipment. Also, as used herein, a "mobile device" may be a mobile phone, smart device (e.g., smartphone), tablet computer, laptop, or any other computing device including a portable energy source (e.g., battery, etc.) capable of powering the device when not connected to an external power source.

In the example of FIG. 1, mobile device 100 includes a processing resource 110 and a machine-readable storage medium 120 encoded with instructions 122, 124, 126, and 128. In some examples, storage medium 120 may include additional instructions. In some examples, instructions 122, 124, 126, 128, and any other instructions of storage medium 120 may be part of an authentication application of mobile device 100.

In examples described herein, a processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. Processing resource 110 may fetch, decode, and execute instructions stored on storage medium 120 to perform the functionalities described below. In other examples, the functionalities of any of the instructions of storage medium 120 may be implemented in the form of electronic circuitry, in the form of executable instructions encoded on a machine-readable storage medium, or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a Compact Disc Read Only Memory (CD-ROM), any other type of compact disc, a DVD, etc.), and the like, or a combination thereof. Further, any machine-readable storage medium described herein may be non-transitory.

In the example of FIG. 1, instructions 122 may register a user identifier 182 with a remote authentication service used by a computing device for user authentication. In some examples, the remote authentication service may be implemented by at least one program, application, or the like, on at least one server accessible via a communications network. As used herein, a communications network may include at least one computer network, at least one telephone network, or a combination thereof. In some examples, computer networks include, for example, a local area network (LAN), a wireless local area network (WLAN), a virtual private network (VPN), the internet, and the like. Instructions 122 may register user identifier 182 by exchanging communication(s) with the remote authentication service via a network interface of mobile device 100. As used herein, a "network interface" is at least one hardware component that may be used by a computing device to communicate with at least one other computing device via a communications network. In some examples, the network interface may be a wireless network interface.

In some examples, instructions 122 may provide, to the remote authentication service, a request to register user identifier 182 with the service. User identifier 182 may be associated with a user of mobile device 100 and may be utilized for authentication of the user to the computing device. Instructions 122 may also exchange communication(s) with the remote authentication service via the network interface to establish a decryption key associated with user identifier 182 in the remote authentication service. In such examples, the remote authentication service may store the decryption information and associate it with user identifier 182. The remote authentication service may use the decryption information associated with user identifier 182 to decrypt data encrypted by a mobile device associated with user identifier 182.

In some examples, instructions 122 may communicate with the remote authentication service to establish an encryption key used by the mobile device for encryption and a decryption key associated with user identifier 182 at the remote authentication service. In some examples, the encryption and decryption keys may be the same (e.g., for use of symmetric-key algorithms) or different (e.g., for the use of asymmetric-key algorithms). Instructions 122 may coordinate with the service to agree upon encryption and decryption information, instructions 122 may generate or obtain the decryption key and then provide it to the remote authentication service, or instructions 122 and the remote authentication service may obtain their respective keys from a third party service (e.g., a certificate authority). Instructions 122 may store the encryption key in memory (e.g., a machine-readable storage medium) of mobile device 100.

In some examples, instructions 122 may further acquire a personal identification number (PIN) of the user, and may provide the PIN to the remote authentication service with user identifier 182. In such examples, the remote authentication service may store the PIN and associate it with user identifier 182. In some examples, instructions 122 may also store the PIN in memory of mobile device 100.

In the example of FIG. 1, mobile device 100 may include an NFC interface, and instructions 124 may utilize the NFC interface to determine that mobile device 100 is within NFC proximity of the computing device. As used herein, near field communication (NFC) may be any type of short-range wireless communication having a range of about ten centimeters (10 cm) or less. In some examples, NFC may be a type of wireless communication having a range of about four centimeters (4 cm) or less. As used herein, an NFC interface may be at least one hardware component that may be used by a computing device to communicate via NFC. In some examples, an NFC interface may be used to at least one of send, receive, and retrieve data via NFC. As used herein, a first device is within "NFC proximity" of a second device when the first and second devices are close enough together to communicate via NFC. For example, instructions 124 may determine that mobile device 100 is within NFC proximity of the computing device in response to determining that the NFC interface of mobile device 100 is close enough to an NFC interface of the computing device to communicate via NFC. In some examples, instructions 124 may determine that mobile device 100 is within NFC proximity of the computing device in response to detecting an NFC interface of the computing device via NFC.

In response to determining that mobile device 100 is within NFC proximity of the computing device, instructions 124 may acquire current time-sensitive data 184 from a periodically different time-sensitive data source 115 of mobile device 100. Source 115 of mobile device 100 may generate time-sensitive data. As used herein, "time-sensitive data" is information whose validity authentication purposes expires within a short period of time (e.g., one minute). In the example of FIG. 1, the time-sensitive data generated by source 115 may be valid for use in authentication by remote authentication service for a short period of time (e.g., one minute, less than a minute, a few minutes, etc.). In such examples, remote authentication service will consider received time-sensitive data to be valid if it is received, considered, etc., prior to its expiration.

In the example of FIG. 1, the respective values of time-sensitive data generated by source 115 may vary periodically, and may be referred to herein as "periodically different" time-sensitive data. For example, source 115 may periodically generate a new time-sensitive data value to provide to instructions 124 when accessed (e.g., in response to a request for a current time-sensitive data value). In other examples, source 115 may generate and return a time-sensitive data value in response to being accessed (e.g., in response to a request for data). In such examples, source 115 may generate and return two different time-sensitive data values in response to two accesses separated by more than a given period of time.

The period of time after which source 115 may generate a new time-sensitive data value (either automatically or in response to being accessed) may be a short period of time. For example, the period of time may be about the same as the period for which time-sensitive data remains valid (e.g., one minute, less than a minute, a few minutes, etc.). In some examples, the time-sensitive data may be a periodically changing counter value, a periodically changing timestamp, or the like, or any data based on or derived from such data. Any of the functionalities of source 115 of mobile device 100 may be implemented in the form of electronic circuitry, in the form of executable instructions encoded on a machine-readable storage medium, or a combination thereof. In examples in which at least some of the functionalities of source 115 are implemented in the form of executable instructions, the instructions may be stored on storage medium 120 and executed by processing resource 110.

In the example of FIG. 1, the remote authentication service may generate the same periodically different time-sensitive data as source 115 in parallel with source 115 or may otherwise determine the values that source 115 may have generated within a threshold amount of time of a given time (e.g., a time of receipt or analysis of time-sensitive data). Based on this generated or determined information, the remote authentication service may determine whether received time-sensitive data was generated within a threshold amount of time of the receipt or analysis of the data by the remote authentication service. In such examples, if it is determined that the received data was generated within the threshold time, the remote authentication service may determine that the received data is valid for authentication, and not otherwise.

As noted above, in response to determining that mobile device 100 is within NFC proximity of the computing device, instructions 124 may acquire current time-sensitive data 184 from periodically different time-sensitive data source 115 of mobile device 100. Instructions 124 may request, retrieve, or otherwise acquire a current time-sensitive data 184 from source 115 in response to the determination. Current time-sensitive data 184 may be the time-sensitive data value generated by source 115, as described above, during a time period in which instructions 124 acquire time-sensitive data from source 115.

Instructions 126 may encrypt current time-sensitive data 184 such that it is decryptable using decryption information that the remote authentication service has associated with the registered user identifier. As described above, instructions 122 may store encryption information (e.g., an encryption key) and the remote authentication service may associate corresponding decryption information (e.g., a decryption key) with user identifier 182 in the remote authentication service. In such examples, instructions 126 may encrypt current time-sensitive data 184 with the encryption information stored at mobile device 100 so that the remote authentication service may decrypt time-sensitive data 184 using the decryption information associated with user identifier 182 at the remote authentication service. By encrypting the current time-sensitive data 184, instructions 126 may generate encrypted time-sensitive data 174.

Instructions 128 may wirelessly provide, to the computing device, an authentication token 186 including user identifier 182 and encrypted time-sensitive data 174. Instructions 128 may generate token 186. Although authentication token 186 includes encrypted time-sensitive data 174, authentication token 186 may include user identifier 182 in cleartext. In such examples, when the remote authentication service receives authentication token 186, the service may read the cleartext user identifier 182 and look up the decryption information associated with user identifier 182, as described further below.

In some examples, instructions 128 may acquire a PIN of the user and include the PIN in authentication token 186. In such examples, instructions 128 may retrieve the PIN from memory of mobile device 100, if previously stored there by instructions 122, as described above. In other examples, instructions 128 may prompt a user of mobile device 100 to enter the PIN in response to detecting that mobile device 100 is within NFC proximity of the computing device. After acquiring the PIN, instructions 128 may include the PIN in authentication token 186 when it is generated. In some examples, the PIN may be included in token 186 in cleartext. In other examples, it may be encrypted by instructions 126 using the stored encryption information.

In some examples, instructions 128 may provide authentication token 186 to the computing device via NFC. In such examples, instructions 128 may utilize the NFC interface of mobile device 100 to provide authentication token 186 to an NFC interface of the computing device. In such examples, instructions 128 may establish a bi-directional NFC connection with the computing device (e.g., via an NFC handshaking procedure), and may provide authentication token 186 to the computing device via NFC using the established bi-directional NFC connection. In other examples, an NFC interface of the computing device may be in a tag emulation mode (or card emulation mode) in which the computing device presents its NFC interface as an NFC tag from which data may be read, and to which data may be written (programmed). In such examples, instructions 128 may provide authentication token 186, via NFC, to the NFC interface of the computing device while the NFC interface is in the tag emulation mode.

In other examples, instructions 128 may acquire, from the computing device via a first type of wireless communication, at least one connection attribute for a second type of wireless communication having a greater range than the first type. For example, the first type of wireless communication may be NFC. In such examples, instructions 128 may acquire, from the computing device via NFC, at least one connection attribute for a second type of wireless communication having a greater range. In some examples, the second type of wireless communication may be any type of wireless communication having a maximum range of about twenty meters (20 m) or more. In some examples, the second type may be the wireless communication utilized by WLAN devices, devices developed in accordance with, for example, Institute of Electrical and Electronics Engineers (IEEE)

802.11 standards, or the like, or a combination thereof. In such examples, the second type of wireless communication may be Wi-Fi.

In such examples, the acquired connection attribute(s) may include one or more of an Internet Protocol (IP) address, a host name for the computing device, a guest identifier (ID), a machine access control (MAC) address, a sub-net mask, a Wi-Fi Protected Access (WPA) passphrase, or any other suitable attributes for establishing a Wi-Fi connection, or a combination thereof. Instructions 128 may further establish, based on the acquired connection attribute (s), a connection of the second type of wireless communication (e.g., a Wi-Fi connection) between mobile device 100 and the computing device. For example, the connection of the second type of wireless communication could be a direct peer-to-peer connection, a connection in which the computing device serves as an access point for mobile device 100, or a connection through an access point separate from mobile device 100 and the computing device. In such examples, after establishing the connection, instructions 128 may wirelessly provide authentication token 186 to the computing device via the second type of wireless communication. In such examples, instructions 128 may utilize a wireless network interface of mobile device 100 to establish and communicate via the second type of wireless communication (e.g., Wi-Fi).

In some examples, the computing device may be a printing device. As used herein, a "printing device" may be a hardware device, such as a printer, multifunction printer (MFP), or any other device including at least functionalities for physically producing graphical representation(s) (e.g., text, images, etc.) on paper, or the like. In some examples, an MFP may be capable of performing a combination of multiple different functionalities such as, for example, printing, photocopying, scanning, faxing, etc.

In response to receiving authentication token 186, the computing device may provide authentication token 186 to the remote authentication service for authentication. The remote authentication service, in response to receiving authentication token 186, may look up the cleartext user identifier 182 in the service to find the decryption information associated with user identifier 182 in the service. The service may then use the decryption information to decrypt the encrypted time-sensitive data 174 to obtain the (cleartext) time-sensitive data 184. The service may then determine whether time-sensitive data 184 was generated within a threshold amount of time (e.g., one minute) of the receipt or analysis of the data by the remote authentication service.

If so, the remote authentication service may determine that the user associated with user identifier 182 is authenticated, and may inform the computing device that the user is authenticated (e.g., in a communication that identifies the user and indicates that the user is authenticated). In response, the computing device may grant the user access to at least one functionality of the computing device (e.g., printing device). If time-sensitive data 182 was not within the threshold, the remote authentication service may determine that the user associated with user identifier 182 is not authenticated, and may inform the computing device that the user is not authenticated. In response, the computing device may not grant the user access to functionalities of the computing device. In examples in which the token 186 includes the PIN, the remote authentication service may further determine whether the PIN of token 186 matches the PIN stored at the remote authentication service when determining whether the user is authenticated. In some examples, encrypted time-sensitive data 174 may be corrupted in transit (maliciously or unintentionally), or may be encrypted with the wrong key. In such examples, the result of decrypting the encrypted time-sensitive data 174 with the decryption information associated with user identifier 182 in the service will not be cleartext time-sensitive data 184. In such examples, the remote authentication service may determine that the result of the decryption is not time-sensitive data generated within a threshold amount of time of the receipt or analysis of the data by the remote authentication service. In response, the remote authentication service may determine that the user associated with user identifier 182 is not authenticated, and may inform the computing device that the user is not authenticated, as described above.

After the user is authenticated to the computing device, the user may explicitly log out, or may be logged out due to inactivity or any other suitable event. In some examples, instructions 122, 124, 126, and 128 may be part of an installation package that, when installed, may be executed by processing resource 110 to implement the functionalities described herein in relation to instructions 122, 124, 126, and 128. In such examples, storage medium 120 may be a portable medium, such as a CD, DVD, or flash drive, or a memory maintained by a server from which the installation package can be downloaded and installed. In other examples, instructions 122, 124, 126, and 128 may be part of an application, applications, or component already installed on mobile device 100 including processing resource 110. In such examples, the storage medium 120 may include memory such as a hard drive, solid state drive, or the like. In some examples, functionalities described herein in relation to FIG. 1 may be provided in combination with functionalities described herein in relation to any of FIGS. 2-4.

Figure 2:
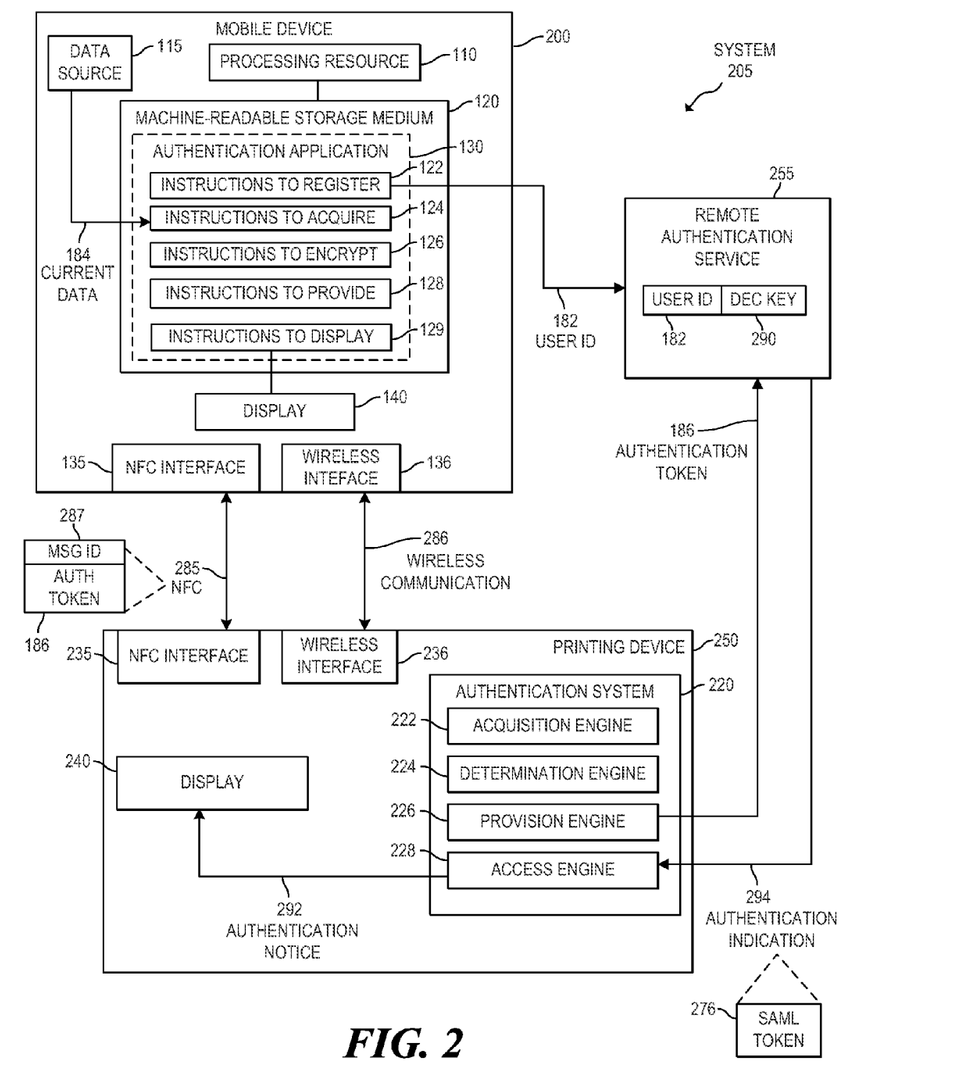
FIG. 2 is a block diagram of an example system including a printing device to provide an authentication token received via near field communication (NFC) to a remote authentication service.

FIG. 2 is a block diagram of an example system 205 including a printing device 250 to provide an authentication token 186 received via NFC to remote authentication service. In the example of FIG. 2, system 205 also includes a remote authentication service 255, as described above in relation to FIG. 1, and a mobile device 200. In other examples, printing device 250 may be any type of computing device described herein.

In the example of FIG. 2, mobile device 200 includes a processing resource 110, a data source 115, a storage medium 120, and instructions 122, 124, 126, and 128, as described above in relation to FIG. 1. In the example of FIG. 2, storage medium 120 may also include instructions 129. In some examples, storage medium 120 may include additional instructions. In the example of FIG. 2, instructions 122, 124, 126, 128, 129, and any other instructions of storage medium 120 may be part of an authentication application 130 of mobile device 200. Mobile device 200 also includes a display 140, an NFC interface 135, and a wireless network interface 136.

In the example of FIG. 2, printing device 250 includes a display 240, an NFC interface 235, a wireless network interface 236, and an authentication system 220 including engines 222, 224, 226, and 228. In some examples, system 220 may include additional engines. Each of the engines of system 220, may be any combination of hardware and programming to implement the functionalities of the respective engine. Such combinations of hardware and programming may be implemented in a number of different ways. For example, the programming for the engines may be processor executable instructions stored on a non-transitory machine-readable storage medium and the hardware for the engines may include a processing resource to execute those instructions. In such examples, the machine-readable storage medium may store instructions that, when executed by the processing resource, implement system 220. The machine-readable storage medium storing the instructions may be integrated in a computing device including the processing resource to execute the instructions, or the machine-readable storage medium may be separate but accessible to the computing device and the processing resource. The processing resource may comprise one processor or multiple processors included in a single computing device or distributed across multiple computing devices. In other examples, the functionalities of any of the engines may be implemented in the form of electronic circuitry.

In some examples, the instructions can be part of an installation package that, when installed, can be executed by the processing resource to implement system 220. In such examples, the machine-readable storage medium may be a portable medium, such as a CD, DVD, or flash drive, or a memory maintained by a server from which the installation package can be downloaded and installed. In other examples, the instructions may be part of an application, applications, or component already installed on a computing device including the processing resource. In such examples, the machine-readable storage medium may include memory such as a hard drive, solid state drive, or the like.

In the example of FIG. 2, instructions 122 may register user identifier 182 with remote authentication service 255 used by printing device 250 for user authentication, as described above in relation to FIG. 1. After the registration, remote authentication service 255 may store user identifier 182, and a decryption key 290, which it has associated with user identifier 182, as described above.

At some point in time after registering user identifier 182 with remote authentication service 255, a user may approach printing device 250 with mobile device 200. In such examples, to authenticate the user to printing device 250 to gain access to functionalities of printing device 250, the user may launch authentication application 130 and then bring mobile device 200 into NFC proximity of printing device 250. In response to a determination that the mobile device is within NFC proximity of printing device 250, instructions 124 may acquire current time-sensitive data 184 from a periodically different time-sensitive data source 115 of mobile device 200, as described above. Additionally, instructions 126 may encrypt current time-sensitive data 184 such that it is decryptable using decryption information 290 that the remote authentication service has associated with the registered user identifier 182, as described above.

In the example of FIG. 2, acquisition engine 222 of printing device 250 may acquire (e.g., receive, retrieve, etc.) from mobile device 200, via NFC, an NFC message 285 including a message type identifier 287 and an authentication token 186 comprising a user identifier 182 and encrypted time-sensitive data 174 (see FIG. 1). Engine 222 may acquire the message via NFC using NFC interface 235. In some examples, engine 222 is to acquire NFC message 285 via a bi-directional NFC connection established between printing device 250 and mobile device 200. The bi-directional connection may be established as described above in relation to FIG. 1, and may utilize NFC interfaces 135 and 235. In other examples, engine 222 may place NFC interface 235 in a tag emulation mode and receive the message 285 from mobile device 200 via NFC interface 235 in a tag emulation mode. NFC message 285 may be an NFC Data Exchange Format (NDEF) message with a size of a few kilobytes or less, for example.

Determination engine 224 may determine, based on message type identifier 287, that NFC message 285 includes information to be provided to remote authentication service 255. For example, the message type identifier 287 may be an identifier reserved for messages including authentication tokens, such as authentication token 186. In response to determining that NFC message 285 includes information to be provided to remote authentication service 255, provision engine may provide authentication token 186 to remote authentication service 255. Engine 226 may provide token 186 to remote authentication service 255 in any suitable message format.

In response to receiving authentication token 186, remote authentication service 255 may determine whether the user is authenticated based on user identifier 182 and the encrypted time-sensitive data 174 of token 186, as described above in relation to FIG. 1, beginning by accessing decryption key 290, which is associated, in remote authentication service 255, with cleartext user identifier 182 included in token 186.

After providing authentication token 186 to remote authentication service 255, access engine 228 may receive, from remote authentication service 255, an indication 294 of whether the user has been authenticated by remote authentication service 255 based on at least user identifier 182 and encrypted time-sensitive data 174 of token 186. Indication 294 may include information identifying the user to printing device 250 in addition to the information indicating whether the user has been authenticated. In response to receipt of an indication 294 that the user has been authenticated by remote authentication service 255 based on user identifier 182 and encrypted time-sensitive data 174, access engine 228 may provide user access to at least one functionality of printing device 250. As used herein, providing user access to a functionality of a computing device may include enabling the functionality and making the functionality accessible via a user interface of the computing device, or via a remote user interface for the computing device. Also in response to receiving the indication 294 that the user has been authenticated, access engine 228 may output, on display 240 of the printing device 250, a notice 292 signifying that the user has been authenticated.

In some examples, in response to authenticating the user based on user identifier 182 and encrypted time-sensitive data 174, remote authentication service 255 may obtain a Security Assertion Markup Language (SAML) token 276 associated with the user. In such examples, engine 228 may receive the SAML token 276 as part of the indication 294 that the user was authenticated. In such examples, access engine 228 may utilize SAML token 276 to access other remote services on behalf of the user using Single-Sign On (SSO). SAML token 276 may be provided as part of indication 294 that the user was authenticated, or may be provided separately.

In some examples, access engine 228 may further receive information specifying at least one functionality of printing device 250 that the user is authorized to utilize when remote authentication service 255 authenticates the user. In such examples, access engine 228 may grant the user access to each of the at least one functionality specified, in response to the receipt of indication 294 that the user has been authenticated and the information specifying the functionalities the user is authorized to utilize. For example, engine 228 may receive an indication 294 that the user is authenticated and information specifying, for example, that the user is authorized to utilize printing and copying functionalities of printing device 250. In such examples, engine 228 may enable the printing and copying features of printing device 250 (and grant access to them via a user interface for printing device 250), but not other features of printing device 250 (e.g., scanning). The authorization information may be provided as part of indication 294 that the user was authenticated, or may be provided separately. In other examples, authorization information associated with a user may be stored at printing device 250 (e.g., in a memory of printing device 250). In such examples, in response to receiving an indication 294 identifying a user and indicating that the user has been authenticated by the remote authentication server, engine 228 may grant the user access to each functionality specified by the authorization information for the user stored at printing device 250.

In response to receipt of an indication 294 that the user has not been authenticated by remote authentication service 255 based on user identifier 182 and encrypted time-sensitive data 174, access engine 228 may not provide user access to any functionalities of printing device 250. In such examples, and also in response to receiving indication 294 that the user has not been authenticated, access engine 228 may output, on display 240 of the printing device 250, a notice 292 signifying that the user has not been authenticated. In some examples, functionalities described herein in relation to FIG. 2 may be provided in combination with functionalities described herein in relation to any of FIGS. 1 and 3-4.

Figure 3:
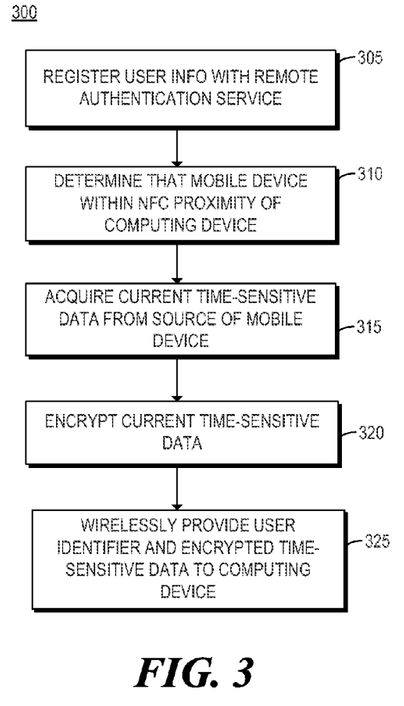
FIG. 3 is a flowchart of an example method for wirelessly providing an authentication token including encrypted time-sensitive data to a computing device.

FIG. 3 is a flowchart of an example method 300 for wirelessly providing an authentication token including encrypted time-sensitive data to a computing device. Although execution of method 300 is described below with reference to mobile device 200 of FIG. 2, other suitable systems for execution of method 300 can be utilized (e.g., mobile device 100). Additionally, implementation of method 300 is not limited to such examples.

At 305 of method 300, instructions 122 may register user information with a remote authentication service used by a computing device for user authentication, the user information including a user identifier 182 and decryption information 290 associated with user identifier 182. At 310, instructions 124 may determine that mobile device 200 is within NFC proximity of a computing device (e.g., printing device 250). In response to the determination, at 315, instructions 124 may acquire current time-sensitive data 184 from periodically different time-sensitive data source 115 of mobile device 200.

At 320, instructions 126 may encrypt, with processing resource 110 of mobile device 200, current time-sensitive data 184 such that it is decryptable using decryption information 290 associated with the user identifier 182 at the remote authentication service. At 325, also in response to the determination that mobile device 200 is within NFC proximity of the computing device, instructions 128 may wirelessly provide an authentication token 186, including user identifier 182 and encrypted time-sensitive data 174 (see FIG. 1), to the computing device.

Although the flowchart of FIG. 3 shows a specific order of performance of certain functionalities, method 300 is not limited to that order. For example, the functionalities shown in succession in the flowchart may be performed in a different order, may be executed concurrently or with partial concurrence, or a combination thereof. In some examples, functionalities described herein in relation to FIG. 3 may be provided in combination with functionalities described herein in relation to any of FIGS. 1-2 and 4.

Figure 4:
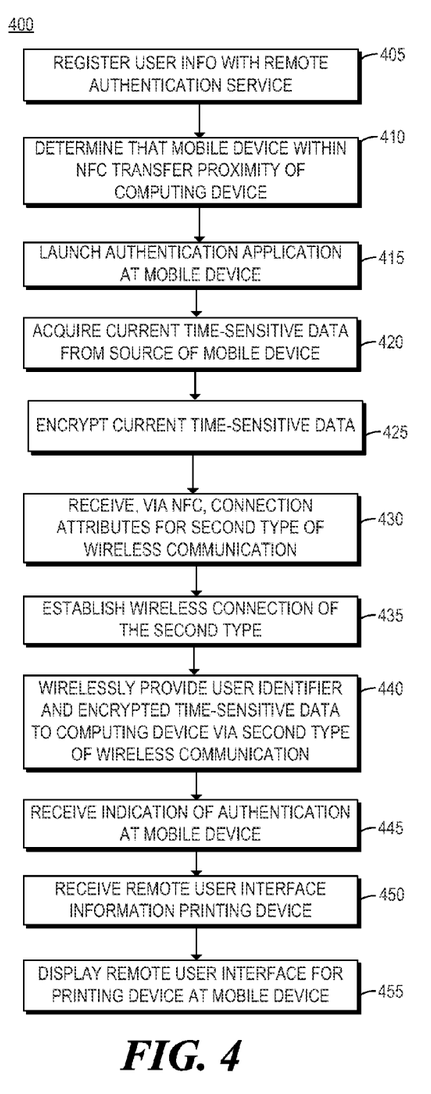
FIG. 4 is a flowchart of an example method for displaying a remote user interface (UI) for a printing device.

FIG. 4 is a flowchart of an example method 400 for displaying a remote user interface (UI) for a printing device. Although execution of method 400 is described below with reference to mobile device 200 of FIG. 2, other suitable systems for execution of method 400 can be utilized (e.g., mobile device 100). Additionally, implementation of method 400 is not limited to such examples.

At 405 of method 400, instructions 122 may register user information with a remote authentication service used by printing device 250 for user authentication, the user information including a user identifier 182 and decryption information 290 associated with user identifier 182. At 410, instructions 124 may determine that mobile device 200 is within NFC proximity of printing device 250.

In response to the determination, at 415, mobile device 200 may launch authentication application 130 of mobile device 200. Also in response to the determination, at 420, instructions 124 may acquire current time-sensitive data 184 from periodically different time-sensitive data source 115 of mobile device 200. At 425, instructions 126 may encrypt, with processing resource 110 of mobile device 200, current time-sensitive data 184 such that it is decryptable using decryption information 290 associated with the user identifier 182 at the remote authentication service.

At 430, instructions 126 may receive, from printing device 250 via a first type of wireless communication, at least one connection attribute for a second type of wireless communication having a greater range than the first type. In some examples, the first type of wireless communication may be NFC and the second type of wireless communication may be Wi-Fi, or the like, as described above in relation to FIG. 2. In such examples, instructions 126 may receive the connection attribute(s) via NFC interface 135. In some examples, printing device 250 may place NFC interface 235 in a tag emulation mode, and instructions 126 may read the connection attribute(s) from NFC interface 235 using NFC interface 135.

At 435, instructions 128 may establish, between mobile device 200 and printing device 250, a connection of the second type of wireless communication utilizing the at least one connection attribute. At 440, and in response to the determination that mobile device 200 is within NFC proximity of printing device 250, instructions 128 of authentication application 130 may wirelessly provide an authentication token 186, including user identifier 182 and encrypted time-sensitive data 174 (see FIG. 1), to printing device 250 via the second type of wireless communication 286. In such examples, the instructions 128 may provide the token 186 to printing device 250 via wireless network interfaces 136 and 236.

At 445, instructions 129 may receive, at mobile device 200, an indication that a user associated with the user information has been authenticated by remote authentication service 255. For example, instructions 129 may receive the indication via the second type of wireless communication using wireless network interface 136. At 450, instructions 129 may further receive, from printing device 250, remote user interface (UI) information. In some examples, the remote UI information may include, for example, web pages that implement a remote UI for printing device 250. At 455, instructions 129 may display, on a display 140 of mobile device 200, a remote UI for printing device 250, based on the received remote UI information. In such examples, instructions 129 may further receive input to the remote UI and provide it to printing device 250. In some examples, the remote UI may grant the authenticated user access to functionalities of printing device 250 that the user is authorized to utilize, as specified by authorization information stored at printing device 250 or received by printing device 250 from the remote authentication service, as described above.

Although the flowchart of FIG. 4 shows a specific order of performance of certain functionalities, method 400 is not limited to that order. For example, the functionalities shown in succession in the flowchart may be performed in a different order, may be executed concurrently or with partial concurrence, or a combination thereof. In some examples, functionalities described herein in relation to FIG. 4 may be provided in combination with functionalities described herein in relation to any of FIGS. 1-3.

What is claimed is:

1. A non-transitory machine-readable storage medium encoded with instructions executable by a processing resource of a mobile device to:
    register a user identifier with a remote authentication service used by a computing device for user authentication;
    in response to a determination that the mobile device is within near field communication (NFC) proximity of the computing device, acquire current time-sensitive data from a periodically different time-sensitive data source of the mobile device, wherein the current time-sensitive data is valid for authentication with the remote authentication service for a short expiration time;
    encrypt the current time-sensitive data such that it is decryptable using decryption information that the remote authentication service has associated with the registered user identifier; and
    wirelessly provide to the computing device an authentication token including the user identifier and the encrypted time-sensitive data.

2. The storage medium of claim 1, wherein the instructions to wirelessly provide comprise instructions to:
    provide the authentication token to the computing device via NFC.

3. The storage medium of claim 2, wherein the instructions to wirelessly provide further comprise instructions to:
    provide the authentication token, via NFC, to an NFC interface of the computing device while the NFC interface is in a tag emulation mode.

4. The storage medium of claim 1, wherein the instructions to wirelessly provide comprise instructions to:
    acquire, from the computing device via a first type of wireless communication, at least one connection attribute for second type of wireless communication having a greater range than the first type, wherein the first type comprises NFC;
    establish, based on the at least connection attribute, a connection of the second type of wireless communication between the mobile device and the computing device; and
    wirelessly provide the authentication token to the computing device via the second type of wireless communication.

5. The storage medium of claim 1, wherein:
    the instructions to provide further comprise instructions to acquire a personal identification number (PIN); and
    wherein the authentication token further comprises the PIN.

6. The storage medium of claim 1, where
    the instructions to register further comprise instructions to provide the decryption key to the remote authentication service;
    the computing device is a printing device; and
    the time-sensitive data is selected from one of the following: a timestamp and a counter value.

7. A computing device comprising:
    an acquisition engine to acquire from a mobile device, via near field communication (NFC), an NFC message including a message type identifier and an authentication token comprising a user identifier and encrypted time-sensitive data, wherein the encrypted time-sensitive data is valid for authentication with the remote authentication service for a short expiration time;
    a determination engine to determine, based on the message type identifier, that the NFC message includes information to be provided to a remote authentication service;
    a provision engine to, in response to the determination, provide the authentication token to the remote authentication service; and
    an access engine to, in response to receipt of an indication that the user identifier has been authenticated by the remote authentication service based on the user identifier and the encrypted time-sensitive data, provide user access to at least one functionality of the computing device.

8. The computing device of claim 7, wherein;
    the acquisition engine is to acquire the NFC message via a bi-directional NFC connection established between the computing device and the mobile device; and
    the indication received from the remote authentication service.

9. The computing device of claim 7, wherein:
    the computing device comprises a printing device; and
    the access engine is further to receive information specifying at least one functionality of the printing device that the user is authorized to utilize;
    wherein the access engine is to grant user access to each of the at least one functionality specified, in response to the receipt of the indication that the user has been authenticated and the information specifying the at least one functionality.

10. The computing device of claim 7, wherein the indication comprises:
    a Security Assertion Markup Language (SAML) token associated with the user.

11. The computing device of claim 7, further comprising:
    a display;
    wherein the access engine is to, in response to the receipt of the indication that the user has been authenticated, output on the display a notice signifying that the user has been authenticated; and
    wherein the access engine is to, in response to receipt of an indication that the user has not been authenticated by the remote authentication service based on the user identifier and the encrypted time-sensitive data, output on the display a notice signifying that the user has not been authenticated.

12. A method comprising:
    registering user information with a remote authentication service used by a computing device for user authentication, the user information including a user identifier and decryption information associated with the user identifier;
    determining that the mobile device is within near field communication (NFC) proximity of the computing device;
    in response to the determination, acquiring current time-sensitive data from a periodically different time-sensitive data source of the mobile device, wherein the current time-sensitive data is valid for authentication with the remote authentication service for a short expiration time;

encrypting, with a processing resource of a mobile device, the current time-sensitive data such that it is decryptable using the decryption information associated with the user identifier; and in response to the determination, wirelessly providing an authentication token to the computing device, the authentication token including the user identifier and the encrypted time-sensitive data.

13. The method of claim 12, further comprising:

in response to the determination, launching an authentication application of the mobile device, wherein the authentication application performs the wirelessly providing the authentication token to the computing device.

14. The method of claim 13, further comprising:

receiving, from the computing device via a first type of wireless communication, at least one connection attribute for a second type of wireless communication having a greater range than the first type, wherein the first type comprises NFC;

establishing, between the mobile device and the computing device, a connection of the second type of wireless communication utilizing the at least one connection attribute; and wherein the wirelessly providing the authentication token comprises wirelessly providing the authentication token from the mobile device to the computing device via the second type of wireless communication.

15. The method of claim 14, wherein computing device comprises a printing device, the method further comprising:

receiving, at the mobile device, an indication that a user associated with the user information has been authenticated by the remote authentication service;

receiving, from the printing device, remote user interface (UI) information; and displaying, at the mobile device, a remote UI for the printing device based on the remote UI information.

* * * * *

UNITED STATES PATENT AND TRADEMARK OFFICE
CERTIFICATE OF CORRECTION

PATENT NO. : 9,762,567 B2  
APPLICATION NO. : 14/770252  
DATED : September 12, 2017  
INVENTOR(S) : Chris R. Gunning et al.

Page 1 of 1

It is certified that error appears in the above-identified patent and that said Letters Patent is hereby corrected as shown below:

In the Claims

In Column 13, Line 45, in Claim 4, after "for" insert -- a --.

In Column 13, Line 48, in Claim 4, after "least" insert -- one --.

In Column 13, Line 60, in Claim 6, delete "where" and insert -- wherein: --, therefor.

In Column 14, Line 21, in Claim 8, delete "wherein;" and insert -- wherein: --, therefor.

In Column 14, Line 25, in Claim 8, after "indication" insert -- is --.

Signed and Sealed this  
Thirteenth Day of March, 2018

Andrei Iancu  
*Director of the United States Patent and Trademark Office*